Patented Nov. 27, 1951

2,576,370

UNITED STATES PATENT OFFICE 2,576,370

INTERPOLYMERIZATION

Pliny O. Tawney, Passaic, N. J., assignor to United States Rubber Company, New York, N. Y., a corporation of New Jersey No Drawing. Application March 18, 1949, Serial No. 82,296

11 Claims. (Cl. 260—23)

This invention relates to a method of increasing the yield of soluble, convertible polymeric materials obtained from the copolymerization of a castor-oil maleate with copolymerizable monoolefinic compounds. More specifically my invention comprises copolymerizing a castor-oil monoleate with at least one copolymerizable monoolefinic compound, in the presence of an aldeolefinic compound, in the presence of an aldehyde, whereby improved yields of soluble, unsaturated convertible resins are obtained.

Copolymers of castor-oil maleates with monoolefinic compounds, e. g., styrene, are in many respects well adapted to the preparation of coating and laminating compositions which, after application, can be cured to a solvent- and heat-resistant state. In this connection they are particularly suitable for blending with other thermosetting resins, e. g., urea-formaldehyde resins, to secure more flexible products. However, such resins derived from castor-oil maleates of high acid number, e. g., 50–100, i. e., those containing relatively large amounts of maleic acid ester groups (such a sare obtained, for example, from the reaction of 1 mole of castor-oil with 2–3 moles of maleic anhydride in a manner well known to those skilled in the art) tend to form an insoluble gel during the copolymerization reaction and before more than a minor proportion of monomers has been converted to the copolymeric form. Such products are of limited commercial utility since the presence of the masses of insoluble gel effects serious discontinuities in the resulting coating or laminate, such as cracks, lumps and blisters. A soluble resin can be obtained, albeit in low yields, by halting the copolymerization prior to gelation, although the large amounts of unreacted monomeric starting materials remaining must be removed, purified and recycled for use in subsequent copolymerizations in order to achieve some degree of economic feasibility. The copolymerization of castor-oil maleates of relatively low acid number, e. g., 20–40 (such as can be obtained from the reaction of 0.3–0.6 mole of maleic anhydride with 1 mole of castor oil), with styrene shows a diminished tendency toward premature gelation but the resulting resins are softer, less mar-resistant, and often require more stringent curing conditions to achieve a satisfactory degree of solvent- and heat-resistance in the final product than those derived from the castor-oil maleates of higher acid number.

I have now discovered that when a castor-oil maleate is copolymerized with styrene in the presence of an appreciable amount of an aldehyde, marked increases in the yield of soluble copolymers can thereby be obtained. I have further discovered that as the amount of the aldehyde present in the initial reaction mixture is increased, the amounts of the castor-oil maleate and the styrene converted to the soluble copolymeric form are likewise increased. I prefer those aldehydes having from 2 to 10 carbon atoms, e. g., acetaldehyde, propionaldehyde, butyraldehyde, and benzaldehyde, as well as the olefinic aldehydes including acrolein, methacrolein, ethacrolein and especially crotonaldehyde.

Although styrene has been cited above as illustrative of the monoelefinic compounds which are suitable for copolymerization with castor-oil maleates in the method of my invention, various substituted styrenes may also be employed, including the alpha- and para-substituted styrenes, e. g., p-chlorostyrene, p-methylstyrene, alpha, p-dimethylstyrene, p-fluorostyrene, p-trichlorodimethylstyrene, p-methoxystyrene, and 2,5-dichlorostyrene. The styrenes can be replaced in whole or part by other monoolefinic hydrocarbons, e. g., vinylnaphthalene, and aliphatic olefinic hydrocarbons especially the lower aliphatic olefinic hydrocarbons, i. e., those having 2 to 6 carbon atoms, such as ethylene, propylene and isobutylene, although many of the more reactive olefins suffer the economic disadvantage of being gases at room temperature, and hence will require pressurized equipment for the copolymerization reaction.

Other suitable copolymerizable monoolefinic compounds which may be used in place of styrene but which tend to yield softer resins include vinyl mono-esters of non-enic acids, e. g., vinyl acetate, vinyl butyrate and vinyl benzoate, and mono-vinyl ethers, e. g., vinyl ethyl ether, vinyl propyl ether and vinyl benzyl ether, and the esters of monoolefinic monocarboxylic acids with non-enic alcohols, e. g., methyl acrylate, n-butyl acrylate, totyl acrylate, methyl methacrylate, n-ethyl chloroacrylate and methyl crotonate. The monoolefinic acids themselves can be employed although the resulting resins are more sensitive to water and other hydroxylic solvents and to alkali. Besides esters, other hydrolyzable derivatives of such monoolefinic acids can be employed, such as the anhydrides, acid chlorides, nitriles and amides, the two latter yielding resins which are harder but are compatible with fewer solvents.

The castor-oil maleates, as is well known to those skilled in the art, are prepared by the esterification of maleic acid or maleic anhydride with castor-oil. Usually about 1 mole of castor-oil is employed per mole of maleic anhydride. This invention also contemplates the employment of castor-oil esters obtained by substitution of some or all of the maleic anhydride by the homologues of maleic acid, such as citraconic acid or citraconic anhydride. If desired, various modifying ingredients, such as linseed oil, may be present in the reaction mixture during the preparation of the ester to be employed in this invention. In the practice of my invention, a castor-oil maleate, preferably having an acid number of from about 30 to 100, is reacted with from 0.5 to 20 moles, particularly 3–12 moles, of a copolymerizable monoolefinic compound, in the presence of from about 6 to 120 moles of an aldehyde (these molar concentrations being based on 1 mole of the castor-oil maleate). The reaction is carried out at temperatures in the range of 25–120° C., particularly 40–100° C., for a reaction time sufficient to form at least an appreciable quantity of the soluble copolymer. A suitable reaction time will usually be found to be in the range of 4–100 hours. The copolymerization is promoted by conventional sources of free radicals including peroxides, e. g., benzoyl peroxide, acetyl peroxide and tertiary-butyl hydroperoxide, in amounts of from 0.1 to 10.0% on the combined weight of the castor-oil ester and copolymerizable monoolefin.

The progress of my copolymerization reaction can be followed by observing the increase in the viscosity of the reaction mixture and the resulting copolymer can be isolated therefrom, if desired, by evaporation of the aldehyde or by precipitation of the copolymer through addition of a non-solvent, e. g., methanol.

The resulting resins can be dissolved in appropriate solvents, e. g., acetone, xylene, or mixtures thereof, and employed as coating, impregnating or laminating compositions, either alone or in conjunction with other polymeric materials such as urea-formaldehyde resins. Upon application of heat, these compositions are converted to a solvent- and heat-resistant state.

The following examples disclose my invention in more detail. All parts are by weight.

Example 1

About 100 parts of castor-oil maleate (acid number, 54) are copolymerized with approximately 121 parts of styrene in the presence of various amounts of a number of aldehydes. The reactions are carried out at 60° C., in the presence of benzoyl peroxide, until the point of incipient gelation is attained in each case. The reaction mixtures are then diluted with an excess of methanol and the precipitated copolymers are washed thoroughly with methanol after which they are dried in vacuo to constant weight.

Table I below summarizes the experimental details including the amounts of the aldehydes, peroxide and soluble copolymeric product, as well as the reaction times. To further emphasize the advantages of my invention, examples of copolymerization in the absence of aldehydes are also included (I–a,b).

Table I

| | Aldehyde | Benzoyl Peroxide | Reaction Time (Hrs.) | Soluble Copolymer |
|---|---|---|---|---|
| a | | 1.1 | 4.7 | 15.2 |
| b | | 2.04 | 6.4 | 24.2 |
| c | Benzene 186 | 1.31 | 4.1 | 24.9 |
| d | Crotonaldehyde 40.6 | 1.89 | 17.5 | 50.0 |
| e | Crotonaldehyde 163.5 | 5.19 | 71.0 | 64.0 |
| f | Crotonaldehyde 810.0 | 1.94 | 5.7 | 38.4 |
| g | Isobutyraldehyde 168.0 | 2.33 | 5.3 | 30.6 |
| | Benzaldehyde 260.5 | | | |

Example 7

In the manner of Example 1, 13.5 parts of castor-oil maleate (acid number, 70) are copolymerized at 80° C. with 15.5 parts of styrene in the presence of 180 parts of crotonaldehyde, four one-part increments of benzoyl peroxide being added from time to time during the 13 hours of reaction. About 15.7 parts of soluble copolymer are obtained.

A mixture of 4.34 parts of a 40.4% solution of the copolymer in xylene and 1.37 parts of a 54.8% solution of a commercial urea-formaldehyde resin in xylene is poured onto a glass plate and baked for 30 minutes at 150° C. to yield a clear, tough, solvent-resistant film.

Example 3

A mixture of 103 parts of castor-oil maleate (acid number, 54), 68.8 parts of vinyl acetate, 28.8 parts of n-butyraldehyde and 1.0 part of benzoyl peroxide is heated at 71° C. for 3.6 hours to yield 32.4 parts of soluble copolymer which can be converted to an insoluble and heat-resistant state by heating at elevated temperatures, e. g., 150° C.

Having thus described my invention, what I claim and desire to protect by Letters Patent is:

1. A method of copolymerizing a castor-oil maleate ester with a copolymerizable monoolefinic compound to form a soluble, convertible copolymer, which comprises carrying out the said copolymerization in the presence of from 6 to 120 moles of a mono-aldehyde selected from the group consisting of unsubstituted aliphatic aldehydes and alpha-olefinic aldehydes having from 2 to 10 carbon atoms, per mole of castor-oil maleate, and an organic peroxidic polymerization catalyst.

2. A method of copolymerizing an ester of castor-oil and an unsaturated dibasic organic acid selected from the group consisting of maleic acid and its homologues with a copolymerizable monoolefinic compound to form a soluble, convertible copolymer, which comprises carrying out the said copolymerization in the presence of from 6 to 120 moles of a mono-aldehyde selected from the group consisting of unsubstituted aliphatic aldehydes and alpha-olefinic aldehydes having from 2 to 10 carbon atoms, per mole of castor-oil ester, and an organic peroxidic polymerization catalyst.

3. A method which comprises heating a mixture of 1 mole of a castor-oil maleate having an acid number of from 30 to 100, 0.5 to 20 moles of a copolymerizable monoolefinic compound, and 6 to 120 moles of a mono-aldehyde selected from the group consisting of unsubstituted aliphatic aldehydes and alpha-olefinic aldehydes having from 2 to 10 carbon atoms, at a temperature of 25° to 125° C., in the presence of an organic peroxidic polymerization catalyst in amount of from 0.1 to 10% on the combined weight of the said castor-oil maleate and copolymerizable monoolefinic compound, whereby a soluble, convertible copolymer is obtained.

4. A method which comprises heating a mixture of 1 mole of a castor-oil maleate having an acid number of from 30 to 100, 3 to 12 moles of a copolymerizable monoolefinic compound, and 6 to 120 moles of a mono-aldehyde selected from the group consisting of unsubstituted aliphatic aldehydes and alpha-olefinic aldehydes having from 2 to 10 carbon atoms, at a temperature of 40° to 100° C., in the presence of an organic peroxidic polymerization catalyst in amount of from 0.1 to 10% on the combined weight of the said castor-oil maleate and copolymerizable monoolefinic compound, whereby a soluble, convertible copolymer is obtained.

5. A method as in claim 4 in which the aldehyde is crotonaldehyde.

6. A method as in claim 4 in which the aldehyde is isobutyraldehyde.

7. A method as in claim 4 in which the aldehyde is benzaldehyde.

8. A method as in claim 4 in which the copolymerizable monoolefine is styrene and the aldehyde is crotonaldehyde.

9. A method as in claim 4 in which the copolymerizable monoolefine is a lower aliphatic monoolefinic hydrocarbon and the aldehyde is crotonaldehyde.

10. A method as in claim 4 in which the copolymerizable monoolefine is styrene and the aldehyde is isobutyraldehyde.

11. A method as in claim 4 in which the copolymerizable monoolefine is styrene and the aldehyde is benzaldehyde.

PLINY O. TAWNEY.

REFERENCES CITED

The following references are of record in the file of this patent:

UNITED STATES PATENTS

| Number | Name | Date |
|---|---|---|
| 2,252,333 | Rothrock | Aug. 12, 1941 |
| 2,439,953 | Swiss et al. | Apr. 20, 1948 |